(12) United States Patent
Walton

(10) Patent No.: US 10,339,215 B2
(45) Date of Patent: Jul. 2, 2019

(54) DETERMINING A READING SPEED BASED ON USER BEHAVIOR

(71) Applicant: INTERNATIONAL BUSINESS MACHINES CORPORATION, Armonk, NY (US)

(72) Inventor: Kaleb D. Walton, Byron, MI (US)

(73) Assignee: INTERNATIONAL BUSINESS MACHINES CORPORATION, Armonk, NY (US)

(*) Notice: Subject to any disclaimer, the term of this patent is extended or adjusted under 35 U.S.C. 154(b) by 44 days.

(21) Appl. No.: 15/378,282

(22) Filed: Dec. 14, 2016

(65) Prior Publication Data

US 2018/0165268 A1    Jun. 14, 2018

(51) Int. Cl.
*G06F 17/27*    (2006.01)

(52) U.S. Cl.
CPC .................................. *G06F 17/27* (2013.01)

(58) Field of Classification Search
None
See application file for complete search history.

(56) References Cited

U.S. PATENT DOCUMENTS

| | | | |
|---|---|---|---|
| 8,271,865 B1* | 9/2012 | Bennett | G06F 17/212 704/1 |
| 8,818,673 B1* | 8/2014 | Frashure | G01P 21/02 701/70 |
| 2002/0163326 A1* | 11/2002 | Choi | G11B 20/18 324/113 |
| 2008/0247280 A1* | 10/2008 | Bakx | G11B 7/0941 369/44.13 |
| 2012/0001923 A1 | 1/2012 | Weinzimmer et al. | |
| 2013/0054789 A1 | 2/2013 | Ashear | |
| 2015/0264863 A1* | 9/2015 | Muench | A01D 41/02 701/50 |
| 2015/0370331 A1 | 12/2015 | Gonzales, Jr. | |
| 2016/0140692 A1* | 5/2016 | Pais | G09G 5/373 345/428 |

OTHER PUBLICATIONS

Merriam-Webster definition of Wobble, 1 page, Jun. 1, 2018.*
Merriam-Webster definition of Read, 1 page, Jun. 1, 2018.*
Dictionary.com definition of Wobble, 1 page, Jun. 1, 2018.*

* cited by examiner

*Primary Examiner* — Tung S Lau
(74) *Attorney, Agent, or Firm* — Cantor Colburn LLP; Jeffrey S LaBaw

(57) ABSTRACT

Examples of techniques for determining a reading speed based on user behavior are disclosed. In one example implementation according to aspects of the present disclosure, a computer-implemented method may include monitoring, by a processing device, data continuously, wherein the data is generated by a sensor of the user device; determining, by the processing device, an orientation and a wobble of the user device based on the data generated by the sensor; determining, by the processing device, a reading speed of a user using the user device based on the orientation and the wobble; detecting, by the processing device, a change in at least one of the orientation and the wobble of the user device based on the data; and adjusting, by the processing device, the reading speed of the user using the user device based on the change in the at least one of the orientation and the wobble.

17 Claims, 4 Drawing Sheets

DETERMINING A READING SPEED BASED ON USER BEHAVIOR

BACKGROUND

The present disclosure generally relates to data processing systems and, more particularly, relates to accurately detecting a reading speed for a user using data processing systems, based on the user's behavior.

Data processing systems are computing devices such as laptops, smartphones, wearable computing devices, and tablets and have increased in popularity. Many individuals own at least one (if not multiple) of these types devices, which may frequently be used for personal tasks such as checking email, browsing the Internet, taking photos, playing games, and other such activities. Additionally, these devices are also being used to read electronic books.

An electronic book, also known as an "e-book," is an electronic version of a printed book. E-books are readable on computing devices and/or dedicated e-book readers ("e-readers") that are specifically designed to display e-books. The e-book can be streamed to the e-reader (e.g., from a remote memory cloud), or the e-book can be downloaded to the e-reader, where it is stored within a local memory.

SUMMARY

According to examples of the present disclosure, techniques including methods, systems, and/or computer program products for determining a reading speed based on user behavior are provided. An example method may include monitoring, by a processing device, data continuously, wherein the data is generated by a sensor of the user device. The example method may further include determining, by the processing device, an orientation and a wobble of the user device based on the data generated by the sensor. The example method may further include determining, by the processing device, a reading speed of a user using the user device based on the orientation and the wobble. The example method may further include detecting, by the processing device, a change in at least one of the orientation and the wobble of the user device based on the data. The example method may further include adjusting, by the processing device, the reading speed of the user using the user device based on the change in the at least one of the orientation and the wobble.

Additional features and advantages are realized through the techniques of the present disclosure. Other aspects are described in detail herein and are considered a part of the disclosure. For a better understanding of the present disclosure with the advantages and the features, refer to the following description and to the drawings.

BRIEF DESCRIPTION OF THE DRAWINGS

The subject matter which is regarded as the invention is particularly pointed out and distinctly claimed in the claims at the conclusion of the specification. The foregoing and other features, and advantages thereof, are apparent from the following detailed description taken in conjunction with the accompanying drawings in which:

DETAILED DESCRIPTION

Various implementations are described below by referring to several examples of determining a reading speed based on user behavior. Devices used for reading e-books may estimate an amount of time remaining in a section (e.g., a chapter, a book, etc.) based on a user's reading speed (i.e., how quickly a user reads). This enables the user to anticipate how much time it will take to complete the section. For example, if a user has a 10-minute window in which to read, but a particular section is estimated to take more than the 10-minutes the user has available, the user may decide not to read at that moment to avoid having to stop reading in the middle of the section. Conversely, if the estimated time is less than the amount of available time the user has available to read, the user may be encouraged to read the section knowing that it can be finished in the available time.

In another example, a user is reading a riveting chapter in an e-book, and the user realizes that he is about to begin reading intense material. The user only has 15 minutes of availability, but the estimated time remaining in the section indicates that it will take 25 minutes to complete the section. In this case, because the user does not have enough time to read the section, the user opts to not begin the section. Upon returning to the e-book later, the user starts reading and completes the section in only 8 minutes instead of the estimated 25 minutes. In this case, the user could have completed the section in the 10-minute window of availability but the user did not attempt to do so because the estimated time remaining was inaccurate.

However, a user's behavior may cause the estimated time remaining in a section to be inaccurate. If the user is reading while distracted, the user may read slower and thus not be able to finish a section in the estimated time remaining. For example, if the user is reading an e-book and is interrupted, the user may look away from the e-book for a few moments without turning off the user's device. In this case, the e-reader thinks that the user is reading and does not take into account the user's distraction.

The present disclosure solves these problems by providing techniques to accurately determine a reading speed based on user behavior by detecting an orientation and wobble of the user's device. The orientation and wobble (i.e., unstable movements) patterns of someone reading an e-book are different as compared to when the user is distracted and holding the device (but not actively reading). This difference can be leveraged to determine when to count someone as reading or as not reading. Patterns for orientation and wobble can be personalized and refined over time based on usage and user behavior. Data from sensors of the user's device may be collected and analyzed to determine the orientation and/or wobble. For example, an accelerometer in the user's device may be used to detect changes in orientation and/or wobble.

Figure 1:
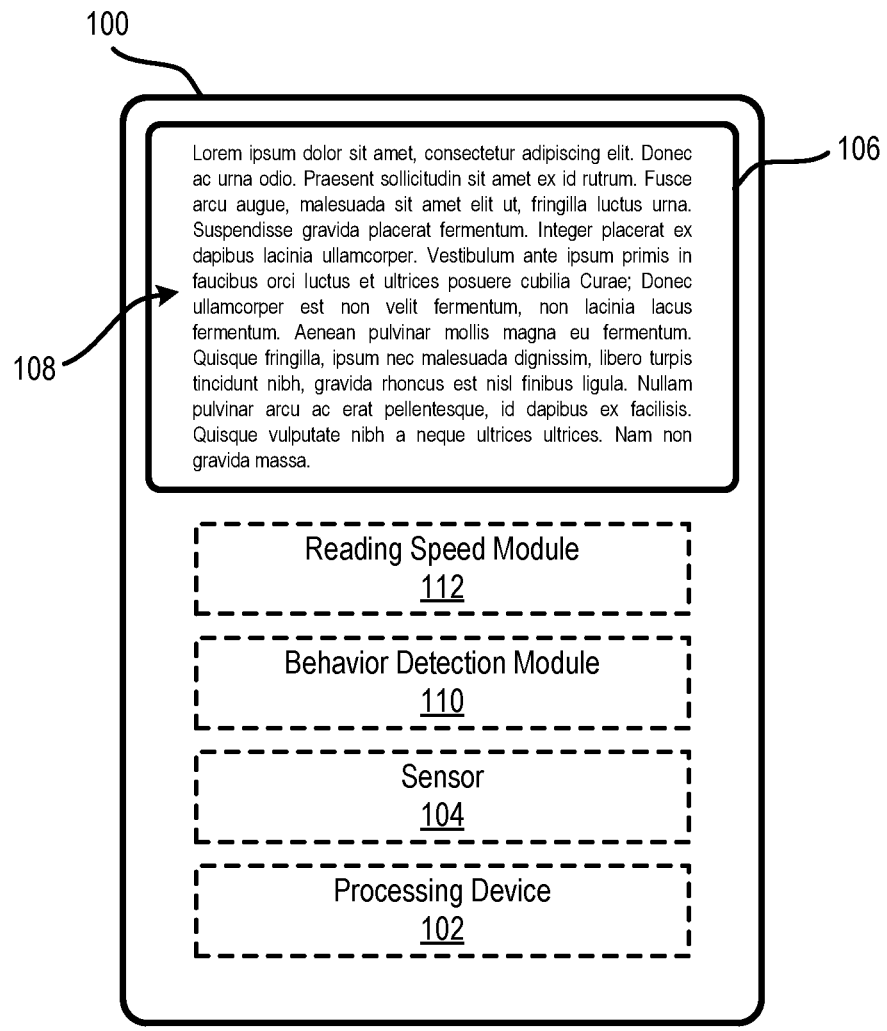
FIG. 1 illustrates a block diagram of a processing system for determining a reading speed based on user behavior according to examples of the present disclosure.

FIG. 1 illustrates a block diagram of a processing system for determining a reading speed based on user behavior according to examples of the present disclosure. The various components, modules, engines, etc. described regarding FIG. 1 may be implemented as instructions stored on a computer-readable storage medium, as hardware modules, as special-purpose hardware (e.g., application specific hardware, application specific integrated circuits (ASICs), as embedded controllers, hardwired circuitry, etc.), or as some combination or combinations of these. In examples, the engine(s) described herein may be a combination of hardware and programming. The programming may be processor executable instructions stored on a tangible memory, and the hardware may include a processing device 102 for executing those instructions. Thus a system memory can store program instructions that when executed by the processing device 102 implement the engines described herein. Other engines may also be utilized to include other features and functionality described in other examples herein.

Alternatively or additionally, the processing system 100 may include dedicated hardware, such as one or more integrated circuits, Application Specific Integrated Circuits (ASICs), Application Specific Special Processors (ASSPs), Field Programmable Gate Arrays (FPGAs), or any combination of the foregoing examples of dedicated hardware, for performing the techniques described herein.

It should be understood that the processing system 100 may include any appropriate type of computing device, including for example smartphones, tablets, desktops, laptops, workstations, servers, smart monitors, smart televisions, digital signage, scientific instruments, retail point of sale devices, video walls, imaging devices, peripherals, wearable computing devices, or the like.

In the example illustrated in FIG. 1, the processing system 100 represents an electronic reader ("e-reader") although other suitable devices are also possible (e.g., a smartphone executing an e-reader application). The processing system 100 includes a processing device 102, a sensor 104, a display 106, a behavior detection module 110, and a reading speed module 112. The processing device 102, the sensor 104, the behavior detection module 110, and the reading speed module 112 are shown with dashed lines to represent that the components are partially or wholly within the processing system 100 and may not be visible externally to the processing system 100. In the example of FIG. 1, the display 106 displays text 108, which represents an e-book.

In other examples, the processing system 100 may include additional components, such as additional processing resources, memory resources, additional sensors, and the like. In examples, the sensor 104 may represent a variety of different sensors and/or sensor arrays, including accelerometers, gyroscopes, magnetometer, manometer, and the like. In examples, the sensor 104 may be an accelerometer to generate a linear signal responsive to detecting a linear movement with respect to at least one of an x-axis, a y-axis, and a z-axis, the linear movement being caused by a touch input received on a region of the computing system.

In some examples of the present disclosure, accelerometers output a signal representative of the difference between the linear acceleration in the device's reference frame and the Earth's gravitational field vector. If linear acceleration is absent, the accelerometer outputs a measure of orientation/rotation of the device, which can be mapped to pitch (about X axis), roll (about Y axis), and yaw (about Z axis). The sensor 104, such as an accelerometer and/or gyroscope, reports changes both in position (linear) and orientation (rotational).

Using the data generated by the sensor 104, the behavior detection module 110 determines user behavior by determining an orientation and/or a wobble of the processing system 100. For example, if a user picks up the processing system 100, but the user is handling the processing system 100 with a high amount of wobble or change in orientation, the behavior detection module 110 indicates that the user is not actively reading, and the reading speed module 112 does not count the time towards reading speed.

When the user begins reading an e-book on the processing system 100, the orientation may remain fairly stable and any wobble may be reduced. In this case, the behavior detection module 110 determines that the user is actively reading, and the reading speed module 112 counts the time towards reading speed.

In this way, the processing system 100 begins to learn wobble patterns of the user to improve detection of subtle deviations in movement. For example, some users may tend to hold the processing device 100 very steady while reading and any deviation in orientation or wobble indicates that the user is not actively reading. Other users, however, may tend to move while reading (i.e., adjusting in his seat, riding in a car, etc.), so the behavior detection module 110 can learn that some wobble or deviation in orientation may not be indicative of the user not actively reading.

In some examples, the behavior detection module 110 can prompt the user to indicate whether he is actively reading. For example, if the behavior detection module 110 detects a small change in orientation or wobble, the behavior detection module 110 may prompt the user to indicate whether he is actively reading. If yes, the user may click "YES" or the like on a notification presented on the display, or the user may dismiss the notification. If the user does not indicate that he is actively reading, the reading speed module 112 does not count the time as reading time. This enables the behavior detection module 110 to learn user patterns and customize the reading speed determination on a per user basis.

In some examples, the behavior detection module 110 may utilize adjustable thresholds (which may be preconfigured) to differentiate between active reading and inactive times. For example, a small change in orientation or amount of wobble (i.e., less than 5%) may indicate active reading, while a larger change in orientation or amount of wobble (i.e., greater than 5%) may be indicative of periods of inactivity. As the behavior detection module 110 learns the user's behaviors, the threshold may be adjusted up or down based on user feedback. Moreover, the user may manually adjust the threshold based on his preferences. For example, the user may be presented with a moveable slider, a list of threshold settings, an input box to manually enter a threshold, or the like so that the user can manually adjust the threshold.

If the change in orientation or amount of wobble hovers at or about the threshold between active reading and inactive, the user may be prompted to indicate whether he is still actively reading. If the user acknowledges in the affirmative, then the threshold may be adjusted slightly to account for the changes in orientation or amount of wobble while the user is reading.

Figure 2:
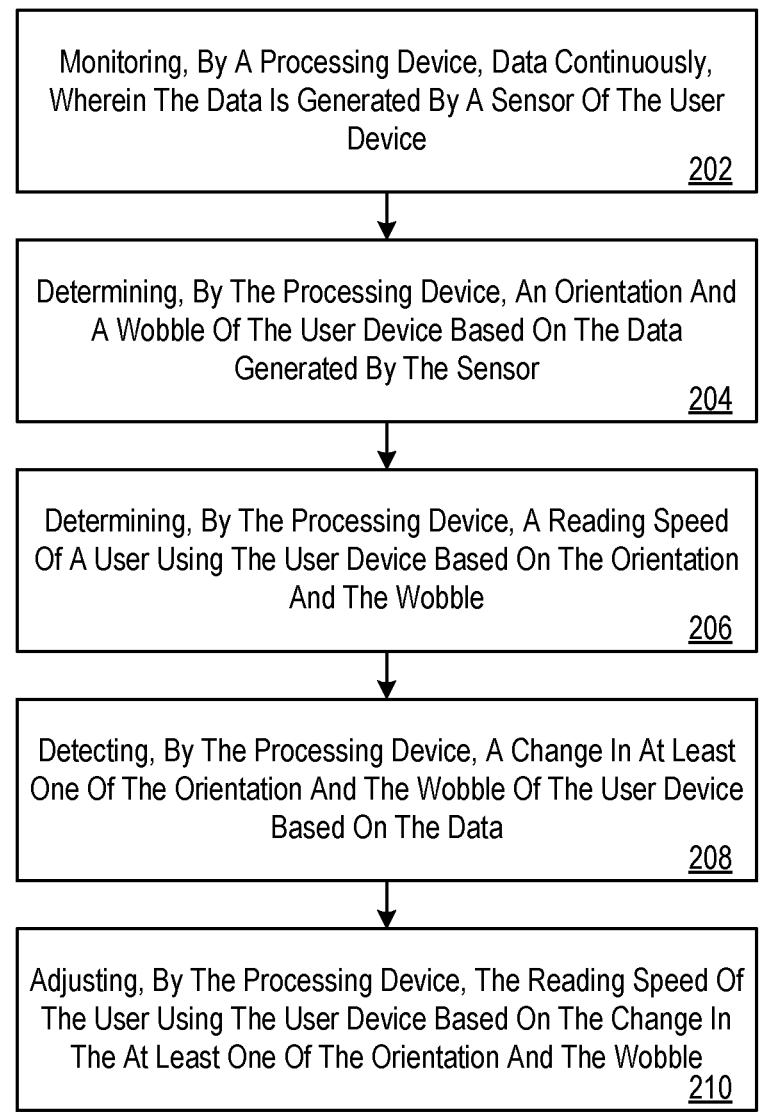
FIG. 2 illustrates a flow diagram of a method for determining a reading speed based on user behavior according to examples of the present disclosure.

FIG. 2 illustrates a flow diagram of a method 200 for determining a reading speed based on user behavior according to examples of the present disclosure. The method 200 may be performed by a processing system such as the processing system 100 of FIG. 1, the processing system 20 of FIG. 4, or by another suitable processing system.

At block 202, the method 200 includes monitoring, by a processing device (e.g., the processing device 102 of FIG. 1), data continuously, wherein the data is generated by a sensor (e.g., the sensor 104 of FIG. 1) of the user device (e.g., the processing system 100 of FIG. 1).

At block 204, the method 200 includes determining, by the processing device, an orientation and a wobble of the user device based on the data generated by the sensor. The orientation and wobble are determined, for example, by the behavior detection module 110 of FIG. 1.

At block 206, the method 200 includes determining, by the processing device, a reading speed of a user using the user device based on the orientation and the wobble. The reading speed is determined, for example, by the reading speed module 112 of FIG. 1.

At block 208, the method 200 includes detecting, by the processing device, a change in at least one of the orientation and the wobble of the user device based on the data.

At block 210, the method 200 includes adjusting, by the processing device, the reading speed of the user using the user device based on the change in the at least one of the orientation and the wobble.

Additional processes also may be included. For example, the method 200 may include comparing, by the processing device, the wobble to an expected wobble, and adjusting, by the processing device, the reading speed of the user when the wobble does not match the expected wobble. In another example, the method 200 may include calculating, by the processing device, an estimated time remaining in an electronic book based on the reading speed, and adjusting, by the processing device, the estimated time remaining based on the change in the at least one of the orientation and the wobble.

Additionally, the method 200 may include displaying the estimated time remaining on the user device. In examples, the method 200 may include prompting, by the processing device, the user to indicate whether the user is reading. This enables the user to train the behavior detection module 110 to recognize when a user is actively reading and when the detected orientation and wobble correctly indicate that the user is not actively reading. For example, if the wobble and/or orientation suggest that the user is not actively reading, but the user indicates that he is, then the behavior detection module 110 can adjust to the user's behavior.

It should be understood that the processes depicted in FIG. 2 represent illustrations, and that other processes may be added or existing processes may be removed, modified, or rearranged without departing from the scope and spirit of the present disclosure.

Figure 3:
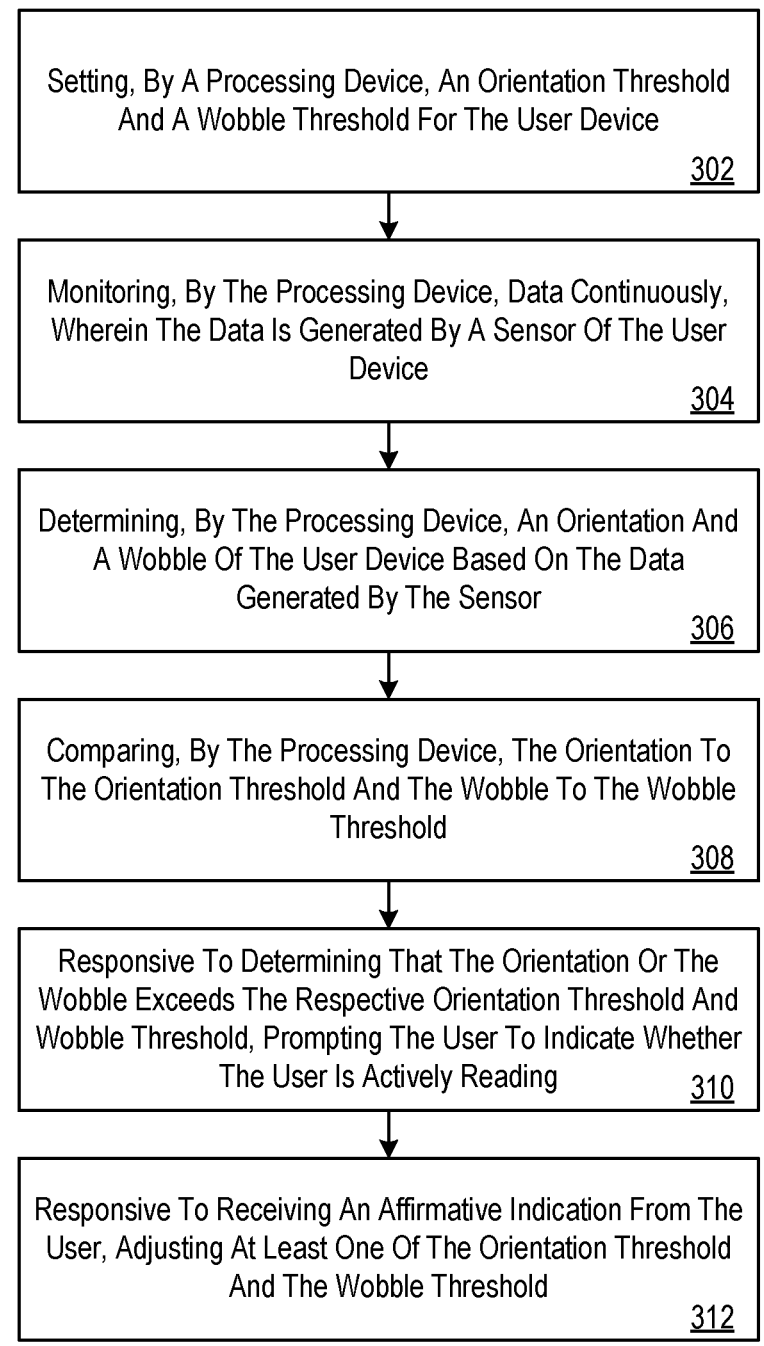
FIG. 3 illustrates a flow diagram of a method for determining a reading speed based on user behavior according to examples of the present disclosure.

FIG. 3 illustrates a flow diagram of a method 300 for determining a reading speed based on user behavior according to examples of the present disclosure. The method 300 may be performed by a processing system such as the processing system 100 of FIG. 1, the processing system 20 of FIG. 4, or by another suitable processing system.

At block 302, the method 300 includes setting, by a processing device (e.g., the processing device 102 of FIG. 1), an orientation threshold and a wobble threshold for a user device (e.g., the processing system 100 of FIG. 1). At block 304, the method 300 includes monitoring, by the processing device, data continuously, wherein the data is generated by a sensor (e.g., the sensor 104 of FIG. 1) of the user device. At block 306, the method 300 includes determining, by the processing device, an orientation and a wobble of the user device based on the data generated by the sensor. At block 308, the method 300 includes comparing, by the processing device, the orientation to the orientation threshold and the wobble to the wobble threshold. At block 310, the method 300 includes responsive to determining that the orientation or the wobble exceeds the respective orientation threshold or wobble threshold, prompting the user to indicate whether the user is actively reading. At block 312, the method 300 includes responsive to receiving an affirmative indication from the user, adjusting at least one of the orientation threshold and the wobble threshold. This enables the processing system to learn user behaviors and adjust accordingly. If the user is not actively reading, the time is not counted towards reading speed.

It should be understood that the processes depicted in FIG. 3 represent illustrations, and that other processes may be added or existing processes may be removed, modified, or rearranged without departing from the scope and spirit of the present disclosure.

Figure 4:
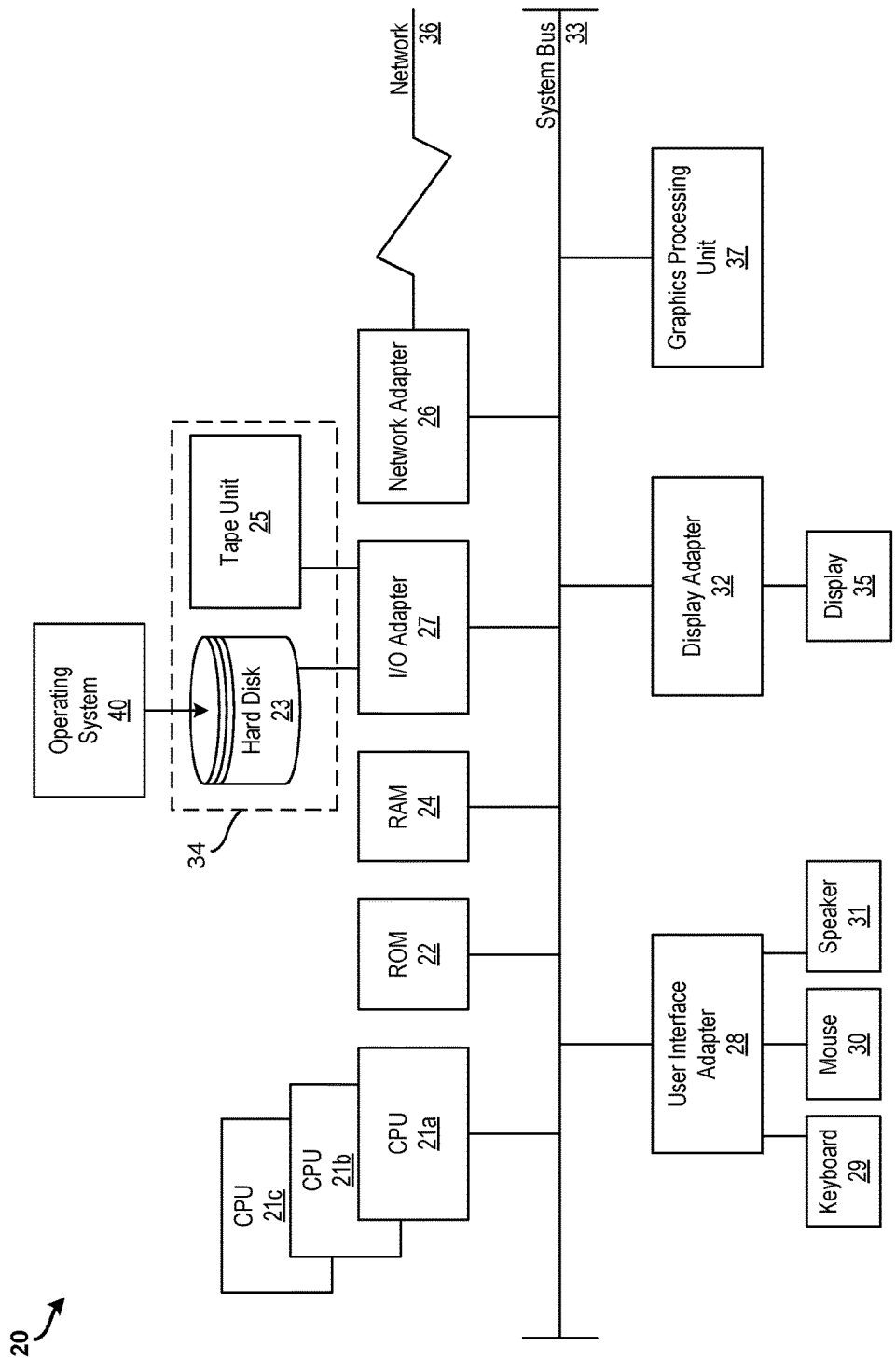
FIG. 4 illustrates a block diagram of a processing system for implementing the techniques described herein according to examples of the present disclosure.

It is understood in advance that the present disclosure is capable of being implemented in conjunction with any other type of computing environment now known or later developed. For example, FIG. 4 illustrates a block diagram of a processing system 20 for implementing the techniques described herein. In examples, processing system 20 has one or more central processing units (processors) 21a, 21b, 21c, etc. (collectively or generically referred to as processor(s) 21 and/or as processing device(s)). In aspects of the present disclosure, each processor 21 may include a reduced instruction set computer (RISC) microprocessor. Processors 21 are coupled to system memory (e.g., random access memory (RAM) 24) and various other components via a system bus 33. Read only memory (ROM) 22 is coupled to system bus 33 and may include a basic input/output system (BIOS), which controls certain basic functions of processing system 20.

Further illustrated are an input/output (I/O) adapter 27 and a communications adapter 26 coupled to system bus 33. I/O adapter 27 may be a small computer system interface (SCSI) adapter that communicates with a hard disk 23 and/or a tape storage drive 25 or any other similar component. I/O adapter 27, hard disk 23, and tape storage device 25 are collectively referred to herein as mass storage 34. Operating system 40 for execution on processing system 20 may be stored in mass storage 34. A network adapter 26 interconnects system bus 33 with an outside network 36 enabling processing system 20 to communicate with other such systems.

A display (e.g., a display monitor) 35 is connected to system bus 33 by display adaptor 32, which may include a graphics adapter to improve the performance of graphics intensive applications and a video controller. In one aspect of the present disclosure, adapters 26, 27, and/or 32 may be connected to one or more I/O busses that are connected to system bus 33 via an intermediate bus bridge (not shown). Suitable I/O buses for connecting peripheral devices such as hard disk controllers, network adapters, and graphics adapters typically include common protocols, such as the Peripheral Component Interconnect (PCI). Additional input/output devices are shown as connected to system bus 33 via user interface adapter 28 and display adapter 32. A keyboard 29, mouse 30, and speaker 31 may be interconnected to system bus 33 via user interface adapter 28, which may include, for example, a Super I/O chip integrating multiple device adapters into a single integrated circuit.

In some aspects of the present disclosure, processing system 20 includes a graphics processing unit 37. Graphics processing unit 37 is a specialized electronic circuit designed to manipulate and alter memory to accelerate the creation of images in a frame buffer intended for output to a display. In general, graphics processing unit 37 is very efficient at manipulating computer graphics and image processing, and has a highly parallel structure that makes it more effective than general-purpose CPUs for algorithms where processing of large blocks of data is done in parallel.

Thus, as configured herein, processing system 20 includes processing capability in the form of processors 21, storage capability including system memory (e.g., RAM 24), and mass storage 34, input means such as keyboard 29 and mouse 30, and output capability including speaker 31 and display 35. In some aspects of the present disclosure, a portion of system memory (e.g., RAM 24) and mass storage 34 collectively store an operating system such as the AIX® operating system from IBM Corporation to coordinate the functions of the various components shown in processing system 20.

The present techniques may be implemented as a system, a method, and/or a computer program product. The computer program product may include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some examples, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to aspects of the present disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various aspects of the present disclosure. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various examples of the present disclosure have been presented for purposes of illustration, but are not intended to be exhaustive or limited to the embodiments disclosed. Many modifications and variations will be apparent to those of ordinary skill in the art without departing from the scope and spirit of the described techniques. The terminology used herein was chosen to best explain the principles of the present techniques, the practical application or technical improvement over technologies found in the marketplace, or to enable others of ordinary skill in the art to understand the techniques disclosed herein.

What is claimed is:

1. A computer-implemented method for determining a reading speed of a user device based on user behavior, the method comprising:
   monitoring, by a processing device, data continuously, wherein the data is generated by a sensor of the user device, the user device presenting an electronic document to a user of the user device;
   receiving, from the sensor, one or more first changes in position and orientation of the user device during a first period of time;
   determining, by the processing device, a first pattern of movement based on the one or more first changes in position and orientation;
   determining, by the processing device, a first reading speed of the user during the first period of time based on the first pattern of movement;
   receiving, from the sensor, one or more second changes in position and orientation of the user device during a second period of time;
   determining, by the processing device, a second pattern of movement based on the one or more second changes in position and orientation; and
   adjusting, by the processing device, the first reading speed to a second reading speed based on a transition from the first pattern of movement to the second pattern of movement.

2. The computer-implemented method of claim 1, further comprising:
   calculating, by the processing device, an estimated time remaining in the electronic document based on the first reading speed; and
   adjusting, by the processing device, the estimated time remaining based on the second reading speed.

3. The computer-implemented method of claim 1, further comprising prompting, by the processing device, the user to indicate whether the user is reading.

4. The computer-implemented method of claim 1, wherein the user device is an electronic reader.

5. The computer-implemented method of claim 1, wherein the user device comprises the processing device.

6. The computer-implemented method of claim 1, wherein the sensor is an accelerometer.

7. The computer-implemented method of claim 1, wherein the sensor is a gyroscope.

8. The computer-implemented method of claim 2, further comprising displaying the estimated time remaining on the user device.

9. A system for determining a reading speed based on user behavior, the system comprising:
   a memory comprising computer readable instructions; and
   a processing device for executing the computer readable instructions for performing a method, the method comprising:
      monitoring, by the processing device, data continuously, wherein the data is generated by a sensor of the user device, the user device presenting an electronic document to a user of the user device;
      receiving, from the sensor, one or more first changes in position and orientation of the user device during a first period of time;
      determining, by the processing device, a first pattern of movement based on the one or more first changes in position and orientation;
      determining, by the processing device, a first reading speed of the user during the first period of time based on the first pattern of movement;
      receiving, from the sensor, one or more second changes in position and orientation of the user device during a second period of time;
      determining, by the processing device, a second pattern of movement based on the one or more second changes in position and orientation; and
      adjusting, by the processing device, the first reading speed to a second reading speed based on a transition from the first pattern of movement to the second pattern of movement.

10. The system of claim 9, the method further comprising:
    calculating, by the processing device, an estimated time remaining in the electronic document based on the first reading speed; and
    adjusting, by the processing device, the estimated time remaining based on the second reading speed.

11. The system of claim 9, the method further comprising prompting, by the processing device, the user to indicate whether the user is reading.

12. The system of claim 9, wherein the user device is an electronic reader.

13. The system of claim 9, wherein the user device comprises the processing device.

14. The system of claim 9, wherein the sensor is an accelerometer.

15. The system of claim 9, wherein the sensor is a gyroscope.

16. The system of claim 10, the method further comprising displaying the estimated time remaining on the user device.

17. A computer program product for determining a reading speed based on user behavior, the computer program product comprising:
    a computer readable storage medium having program instructions embodied therewith, wherein the computer readable storage medium is not a transitory signal per se, the program instructions executable by a processing device to cause the processing device to perform a method comprising:
       monitoring, by the processing device, data continuously, wherein the data is generated by a sensor of the user device;
       receiving, from the sensor, one or more first changes in position and orientation of the user device during a first period of time;
       determining, by the processing device, a first pattern of movement based on the one or more first changes in position and orientation;
       determining, by the processing device, a first reading speed of a human user during the first period of time based on the first pattern of movement;

receiving, from the sensor, one or more second changes in position and orientation of the user device during a second period of time;
determining, by the processing device, a second pattern of movement based on the one or more second changes in position and orientation; and
adjusting, by the processing device, the first reading speed to a second reading speed based on a transition from the first pattern of movement to the second pattern of movement.

* * * * *